Sept. 17, 1935.  F. A. VOLZ  2,014,709

LINE LEVEL

Filed April 28, 1934

Inventor
Frederick A. Volz

By H. Clay Lindsey

Attorney

Patented Sept. 17, 1935

2,014,709

UNITED STATES PATENT OFFICE 2,014,709

LINE LEVEL

Frederick A. Volz, New Britain, Conn., assignor to The Stanley Works, New Britain, Conn., a corporation of Connecticut Application April 28, 1934, Serial No. 722,916

6 Claims. (Cl. 33—207)

This invention relates to improvements in line levels, and has as its objects to provide a level of this sort which is characterized by its lightness in weight, its economy in manufacture, and its effectiveness in use.

More particularly, an aim of the invention is to provide a line level the casing of which may be simply and economically constructed of sheet metal and which, while light in weight and cheap to manufacture, will, at the same time, securely carry and adequately protect the breakable spirit tube of the level.

A further object lies in the provision in a line level of the character described, of simple and efficient means by which the line level may be easily attached to the line and which will effectively prevent accidental disengagement of the level from the line.

Other objects and advantages will be apparent as the description proceeds.

In the accompanying drawing, in which like reference numerals refer to similar parts throughout, I have illustrated a suitable mechanical embodiment of the idea of the invention. It is to be understood, however, that the drawing is to be taken for the purpose of illustration only and not as limiting the invention the scope of which is to be measured entirely by the scope of the appended claims.

In the accompanying drawing.

Figure 1:
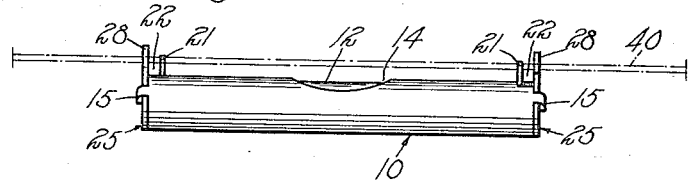
Fig. 1 is an elevational view of a line level shown attached to a line indicated by broken lines in the figure.
Figure 2:
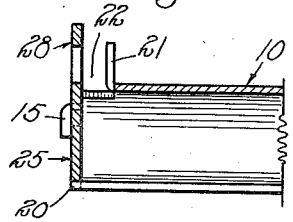
Fig. 2 is a vertical sectional view on an enlarged scale of a fragmentary portion of the line level illustrated in Fig. 1.

Referring to the drawing in detail, the numeral 10 generally indicates the tubular body portion of the casing of a line level constructed according to the idea of this invention. Within this tubular casing, there is the usual spirit tube 12 the bubble of which is observable through a sight opening 14 in the casing.

Figure 5:
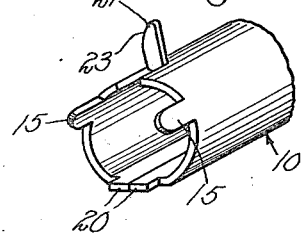
Fig. 5 is a perspective view of a portion of the body member of the line level casing before the end member is attached.
Figure 6:
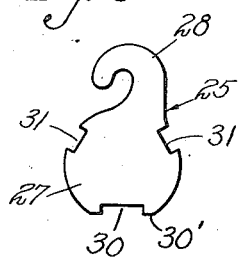
Fig. 6 is an elevational view of an end member of the casing of the line level illustrated in Fig. 1.

The body portion 10 is formed up from sheet metal, by preference aluminum, by stamping out a blank of the desired shape and then bending the blank into tubular form. The blank has a sight opening 14 centrally located with respect to the area thereof, and tongues 15 and 20 projecting from the opposite ends of the blank, as illustrated in Fig. 5. The tongues 20 are located adjacent to the opposite edges of the blank and are of a length substantially equal to the thickness of the metal from which the casing is made. The tongues 15 are located one between each tongue 20 and the longitudinal center line of the blank, at about two-thirds of the distance from the respective tongue 20 to the center line, are materially longer than the tongues 20 and preferably have rounded ends. After the blank for the body member has been formed as described above, it is bent to a substantially cylindrical form with a flattened area extending the length thereof adjacent to the abutting edges of the sheet metal blank. This bending brings the two tongues 20 at each end of the blank together and locates the tongues 15 at approximately 120 degree angles from the respective tongues 20. The flattened area upon each side of the line along which the edges of the blank abut provides a flat bottom for the level so that it will not roll when set down and causes the adjacent tongues 20 to lie together in the same plane. In addition to the tongues mentioned, the casing has tongues 21 formed by making slits in the ends of the casing and then bending the metal between the slits outwardly to extend at right angles to the surface of the body member. These tongues 21 are located upon opposite sides of the longitudinal center line of the original blank, and each has the side thereof remote from the center line rounded off, as indicated at 23, for a purpose to be presently described.

The ends of the tubular body member of the level casing are closed by end members, generally indicated at 25, each of which comprises a substantially circular portion 27 surmounted by an integral hook portion 28. The circular portion 27 is provided with notches 30 and 31 in the circumferential edge thereof of a depth substantially equal to the thickness of the material of the body member, the notch 30 being located diametrically opposite to the hook 28 and being of a width sufficient to receive the two tongues 20 on one end of the body member 10. This notch 30 has a straight inner edge against which the respective pair of tongues 20 of the body member bear when the casing is assembled, and the peripheral edge of the end member immediately adjacent the notch 30 is flattened, as at 30', to conform to the flattened area of the body member. There are two notches 31 located one upon each side of the circular portion of the end member and so spaced from the notch 30 as to receive therein the tongues 15 of the body member. The two end members are formed alike and may be used interchangeably at either end of the body member 10, thus obviating the necessity of providing different end members to close the opposite ends of the body member. This feature is a factor of importance in the manufacture of such devices as it insures unusual accuracy by having the opposite end members exactly alike and is a feature of economy in that it permits a large number of such end members to be stamped out, without any danger of a material loss of work and materials such as would result if there were a different end member for each end of the body member, and more of one kind of end members than the other should be made. This arrangement also eliminates the necessity for additional stamping tools and the need for keeping the end members for different ends of the body member separate.

Figure 3:
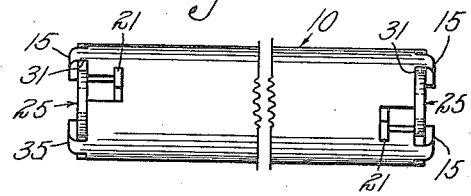
Fig. 3 is a top plan view of fragmentary portions of the line level illustrated in Fig. 1.
Figure 4:
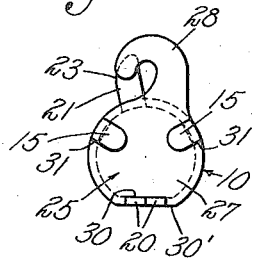
Fig. 4 is an elevational view of one end of the line level illustrated in Fig. 1.

After the body member 10 has been formed into the substantially tubular formation illustrated in Fig. 5 and the spirit tube inserted therein, the end members are positioned on the ends of the body member so that the tongues 20 of the body member fit into the notches 30 of the end members and the tongues 15 of the body member fit into the notches 31 of the end members. The tongues 15 of the body member are then bent down over the end members, as is clearly illustrated at 35 in Fig. 3, to secure the end members against the ends of the body member and against the lugs 20.

The end members 25 are preferably secured to the body member so that the hooks 28 face in opposite directions and so that the open sides of these hooks are overlapped by the respective struck up tongues 21 to an extent which leaves uncovered an area within the hook somewhat greater than the cross sectional area of the line upon which the level is to be mounted. These tongues 21 are spaced from the hook portions of the end members, as indicated at 22, and, by reason of this construction, the line, indicated at 40 in Fig. 1, may be inserted between a tongue 21 and the respective hook 28 and swung around into engagement in the hook, this operation being facilitated by the rounded end portion 23 of the tongues. These tongues 21, overlapping as they do the open sides of the respective hooks, provide an effective guard for preventing accidental disengagement of the line 40 from the hooks 28 once the line level has been mounted on the line in the manner indicated above.

It will be seen from the foregoing description, taken in connection with the accompanying drawing, that the casing parts, comprising the tubular body portion and the flat end plates or members, may each be very economically manufactured by the simplest of operations. The tubular portion is formed by stamping out a blank and bending the blank into form, each of which operations can be very cheaply carried out with inexpensive equipment. The end members require only one operation, namely, a blanking out operation, the cost of which is almost negligible. The parts may be assembled with the greatest facility and very easily secured in assembled relation. The end members are rigidly and permanently secured to the end of the body member by the tongues, and the body member is firmly held in its tubular formation by reason of the fact that the ends of the notches 30 hold the tongues 20 together and effectively prevent separation of the abutting edges of the blank from which the body member is formed. The guard members 21 are formed integrally with the casing, and this effects economy in manufacture. Thus, it will be seen that a line level constructed in accordance with the present invention may be provided at a relatively low cost.

While I have described and illustrated a particular mechanical embodiment of the idea of my invention, it is to be understood that the invention is not specifically limited to the construction so illustrated and described but that such changes in the size, shape, and arrangement of parts may be resorted to as to come within the scope of the appended claims.

Having now described my invention so that others skilled in the art may clearly understand the same, what I desire to secure by Letters Patent is as follows:

I claim as my invention:

1. A line level including a spirit tube and a casing therefor, said casing having a tubular body member provided with a sight opening therein and a plurality of tongues extending beyond each end thereof, a pair of end members mounted against the ends of said body member and held thereagainst by said tongues, a line engaging hook on each of said end members, and a struck up tongue on each end of said body member spaced from the hook portion of the respective end member and overlapping the open side of said hook.

2. A line level including a spirit tube and a casing therefor, said casing having a tubular body member provided with a sight opening therein and a plurality of tongues extending beyond each end thereof, a pair of end members provided with notches for receiving said tongues, and a line engaging hook on each of said end members, some of said tongues being bent over said end members to retain the same in position against the respective ends of said body member.

3. A line level including a spirit tube and a casing therefor, said casing having a tubular body member formed from a stamped sheet metal blank provided with a sight opening and with outwardly projecting tongues at each end thereof, a pair of end members in the form of stamped sheet metal blanks for closing the ends of said body member, some of said tongues being bent over said end members to retain the same in closing relation on the ends of said body member, and a line engaging hook on each of said end members.

4. A line level including a spirit tube and a casing therefor, said casing having a tubular body member formed of a stamped sheet metal blank provided with a sight opening and with outwardly projecting tongues at each end thereof, a pair of end members in the form of stamped sheet metal blanks provided with notches for receiving said tongues, some of said tongues being bent over said end members to retain said end members in closing relation on the respective ends of said body member, a line engaging hook on each of said end members, and a struck up tongue at each end of said body member spaced from the hook portion of the respective end member and overlapping the open side of said hook.

5. A line level including a spirit tube and a casing therefor, said casing having a tubular body member formed from a stamped blank, rolled into generally circular form to bring the side edges of the blank into engagement, said body member having a sight opening therein, a pair of tongues at each end in side by side relation one along each side of the line along which the side edges of the blank engage, said body portion also having additional tongues at each end spaced from said first mentioned tongues, flat end members mounted against the ends of said body member and each having a notch receiving a pair of the first mentioned tongues to hold said tongues together and said body member in tubular form, said second mentioned tongues being bent inwardly over said end members, and integral hook portions on said end members.

6. A line level including a spirit tube and a casing therefor, said casing having a tubular body member formed from a stamped sheet metal blank provided with a sight opening, a tongue extending outwardly from each end of said sheet metal blank adjacent to each edge thereof, a plurality of tongues extending outwardly from each end of said sheet metal blank between said first named tongues, a pair of end members in the form of stamped sheet metal blanks provided with notches for receiving said tongues one notch in each of said end members receiving both of said first mentioned tongues at one end of said body member to hold said tongues together and hold said body member in tubular form, said second named tongues being bent over said end members to retain the same in end closing position upon said body member, a line hook on each of said end members positioned at the side of said body member in which said sight opening is located, and a struck up tongue at each end of said body member spaced from the hook portion of the respective end member and overlapping the open side of said hook.

FREDERICK A. VOLZ.